(12) United States Patent
Kim et al.

(10) Patent No.: US 8,049,856 B2
(45) Date of Patent: Nov. 1, 2011

(54) DISPLAY SUBSTRATE AND DISPLAY DEVICE HAVING THE SAME

(75) Inventors: Dong-Gyu Kim, Gyeonggi-do (KR); Jong-Woong Chang, Chungcheongnam-do (KR); Yun-Hee Kwak, Seoul (KR)

(73) Assignee: Samsung Electronics Co., Ltd. (KR)

( * ) Notice: Subject to any disclaimer, the term of this patent is extended or adjusted under 35 U.S.C. 154(b) by 965 days.

(21) Appl. No.: 11/804,649

(22) Filed: May 18, 2007

(65) Prior Publication Data

US 2008/0001892 A1    Jan. 3, 2008

(30) Foreign Application Priority Data

Jun. 30, 2006   (KR) .................. 10-2006-0060481

(51) Int. Cl.
*G02F 1/1345* (2006.01)
(52) U.S. Cl. .................. 349/149; 349/151; 349/152
(58) Field of Classification Search ........... 349/149–152
See application file for complete search history.

(56) References Cited

U.S. PATENT DOCUMENTS

| | | | |
|---|---|---|---|
| 5,835,177 A | 11/1998 | Dohjo et al. | |
| 6,437,764 B1 * | 8/2002 | Suzuki et al. | 345/87 |
| 7,567,330 B2 * | 7/2009 | Yamada et al. | 349/149 |
| 2002/0180686 A1 * | 12/2002 | Yuda et al. | 345/103 |
| 2003/0117540 A1 * | 6/2003 | Park et al. | 349/43 |
| 2003/0128326 A1 * | 7/2003 | Yamaguchi et al. | 349/152 |
| 2004/0012744 A1 * | 1/2004 | Ishige et al. | 349/139 |
| 2004/0207795 A1 | 10/2004 | Sakai et al. | |

FOREIGN PATENT DOCUMENTS

CN   1333526   1/2002

OTHER PUBLICATIONS

European Search Report corresponding to EP 07011550, dated Sep. 7, 2009, 6 pages.

* cited by examiner

*Primary Examiner* — Hemang Sanghavi
(74) *Attorney, Agent, or Firm* — Innovation Counsel LLP

(57) ABSTRACT

In a display substrate and a display device having the display substrate for reducing a line resistance, the display substrate includes a plurality of pixel parts, a signal line part and a signal pad part. The pixel parts are formed in a display area. The signal line part is formed in a peripheral area surrounding the display area. The signal line part includes a first line formed with a first conductive layer, and a second line formed with a second conductive layer over the first line. The second line overlaps the first line. The signal pad part includes a first pad integrally formed with the first line, and a second pad integrally formed with the second line, wherein an identical driving signal is applied to the first pad and the second pad. Accordingly, the line resistance of the signal line part may be reduced.

17 Claims, 11 Drawing Sheets

DISPLAY SUBSTRATE AND DISPLAY DEVICE HAVING THE SAME

CROSS-REFERENCE TO RELATED APPLICATION

This application relies for priority upon Patent Application No. 2006-60481 filed in the Korean Intellectual Property Office, Republic of Korea, on Jun. 30, 2006, the contents of which is herein incorporated by reference in its entirety.

BACKGROUND OF THE INVENTION

1. Field of the Invention

Embodiments of the present invention relate to a display substrate and a display device having the display substrate. More particularly, embodiments of the present invention relate to a display substrate and a display device having the display substrate providing a reduced line resistance.

2. Description of the Related Art

Generally, a liquid crystal display device includes a display panel for displaying an image by using an optical transmittance of a liquid crystal, and a gate driving circuit and a source driving circuit that are electrically connected with the display panel. The display panel includes a plurality of pixel parts. Each of the pixel parts includes a switching element and a liquid crystal capacitor electrically connected with the switching element. The gate driving circuit outputs a gate signal to turn on the switching element. The source driving circuit outputs a data signal to drive the liquid crystal capacitor.

A gate driving circuit and a source driving circuit formed as a chip may be directly mounted on the display panel for manufacturing a lighter, thinner, shorter, and smaller liquid crystal display device. In a chip on glass structure as mentioned above, signal lines transmitting driving signals to the chip are formed directly on the display panel. When the signal lines are formed directly on the display panel, a signal delay may be induced due to a line resistance of the signal lines, where the signal delay degrades the display quality.

SUMMARY OF THE INVENTION

In accordance with one or more embodiment of the present invention, a display substrate capable of reducing a line resistance is provided. A display device having the display substrate is also provided. More particularly, in a display substrate according to an exemplary embodiment, the display substrate includes a plurality of pixel parts, a signal line part and a signal pad part. The pixel parts are formed in a display area. The signal line part is formed in a peripheral area surrounding the display area. The signal line part includes a first line formed with a first conductive layer, and a second line formed with a second conductive layer over the first line. The second line overlaps the first line. The signal pad part includes a first pad integrally formed with the first line, and a second pad integrally formed with the second line.

In a display device according to another exemplary embodiment of the present invention, the display device includes a plurality of pixel parts, a signal line part and a signal pad part. The pixel parts are formed in a display area. The signal line part is formed in a peripheral area surrounding the display area. The signal line part includes a first line formed with a first conductive layer, and a second line formed with a second conductive layer over the first line. The second line overlaps the first line. The signal pad part includes a first pad integrally formed with the first line, and a second pad integrally formed with the second line. According to the above mentioned display substrate and display device having the display substrate, a line resistance of a signal line part may be reduced because the signal line part includes a first line and a second line that are insulated from each other and are stacked.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

The above and other features and advantages of the present invention will become more apparent by describing, in detail, exemplary embodiments thereof with reference to the accompanying drawings, in which.

Embodiments of the present invention and their advantages are best understood by referring to the detailed description that follows. It should be appreciated that like reference numerals are used to identify like elements illustrated in one or more of the figures.

DESCRIPTION OF THE EMBODIMENTS

Figure 1:
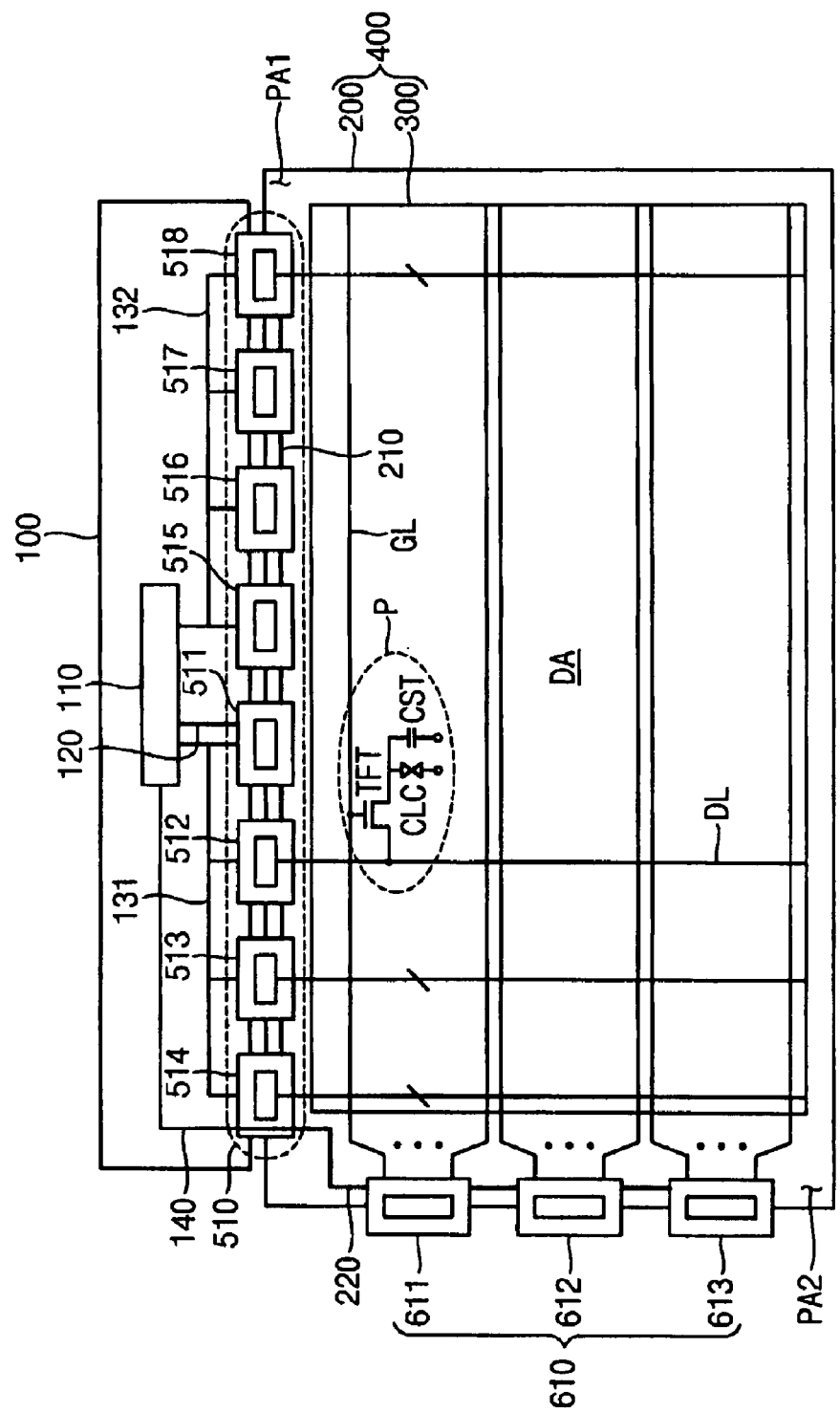
FIG. 1 is a plan view illustrating a display device according to a first exemplary embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "on" or "onto" another element, it may be directly on the other element or intervening elements may also be present. In contrast, when an element is referred to as being "directly on" another element, there are no intervening elements present. In the drawings, the thickness of layers, films, panels, regions, etc., may be exaggerated for clarity. Like reference numerals refer to similar or identical elements throughout.

FIG. 1 is a plan view illustrating a display device according to a first exemplary embodiment of the present invention. Referring to FIG. 1, the display device includes a printed circuit board 100, a display panel 400, a source driving part 510, and a gate driving part 610. A main driving circuit 110 is mounted on the printed circuit board 100. The printed circuit board 100 is electrically connected with the display panel 400 through the source driving part 510. The source driving part 510 includes first, second, third, fourth, fifth, sixth, seventh and eighth source tape carrier packages 511, 512, 513, 514, 515, 516, 517 and 518. The gate driving part 610 includes first, second and third gate tape carrier packages 611, 612 and 613. The tape carrier package (hereinafter, 'TCP') is a flexible printed circuit board on which a driving chip is mounted. A plurality of line parts 120, 131, 132 and 140, which transmit signals outputted from the main driving circuit 110 to the display panel 400, are formed on the printed circuit board 100. For example, a first line part 120 transmits a source driving signal to the source driving part 510. A second line part 131 transmits a data signal to the first, second, third and fourth source TCPs 511, 512, 513 and 514 disposed at a left side of the display panel 400. A third line part 132 transmits a data signal to the fifth, sixth, seventh and eighth source TCPs 515, 516, 517 and 518 disposed at a right side of the display panel 400. The fourth line part 140 transmits a gate driving signal to the first, second and third gate TCPs 611, 612 and 613.

The display panel 400 includes a display substrate 200 and an opposite substrate 300 to be combined with the display substrate 200 to receive a liquid crystal layer (not illustrated). The display panel 400 includes a display area DA displaying an image, and first and second peripheral areas PA1 and PA2 surrounding the display area DA. A plurality of source lines DL and a plurality of gate lines GL crossing the source lines DL are formed in the display area DA. The source lines DL and the gate lines GL define a plurality of pixel parts 'P'. A switching element TFT, a liquid crystal capacitor CLC and a storage capacitor CST are formed in each of the pixel parts 'P'.

The source driving part 510 is mounted in the first peripheral area PA1. For example, the first, second, third and fourth source TCPs 511, 512, 513 and 514 are mounted at a left side of the first peripheral area PA1, and the fifth, sixth, seventh and eighth source TCPs 515, 516, 517 and 518 are mounted at a right side of the first peripheral area PA1. A first signal line part 210 applying a source driving signal to the source driving part 510 is formed in the first peripheral area PA1. The first signal line part 210 is formed between the neighboring source TCPs. The first signal line part 210 transmits the source driving signal to the first, second, third, fourth, fifth, sixth, seventh and eighth source tape carrier packages 511, 512, 513, 514, 515, 516, 517 and 518 in a cascade mode. The source driving signal may be a driving voltage VDD or VSS for driving a source driving chip mounted on the source TCP. The first signal line part 210 may include a power line and a ground line. The first signal line part 210 may include stacked metal layers that are insulated from each other.

The gate driving part 610 is mounted on the second peripheral area PA2. For example, the first, second and third gate TCPs 611, 612 and 613 are mounted on the second peripheral area PA2. A second signal line part 220, which transmits a gate driving signal to the first, second and third gate TCPs 611, 612 and 613, is formed in the second peripheral area PA2. The second signal line part 220 is formed between the neighboring source TCPs. The second signal line part 220 transmits the gate driving signal to the first, second and third gate TCPs 611, 612 and 613 in a cascade mode. The gate driving signal may be a gate voltage VON or VOFF. The second signal line part 220 may include a power line and a ground line. The second signal line part 220 may include stacked metal layers that are insulated from each other.

Figure 2A:
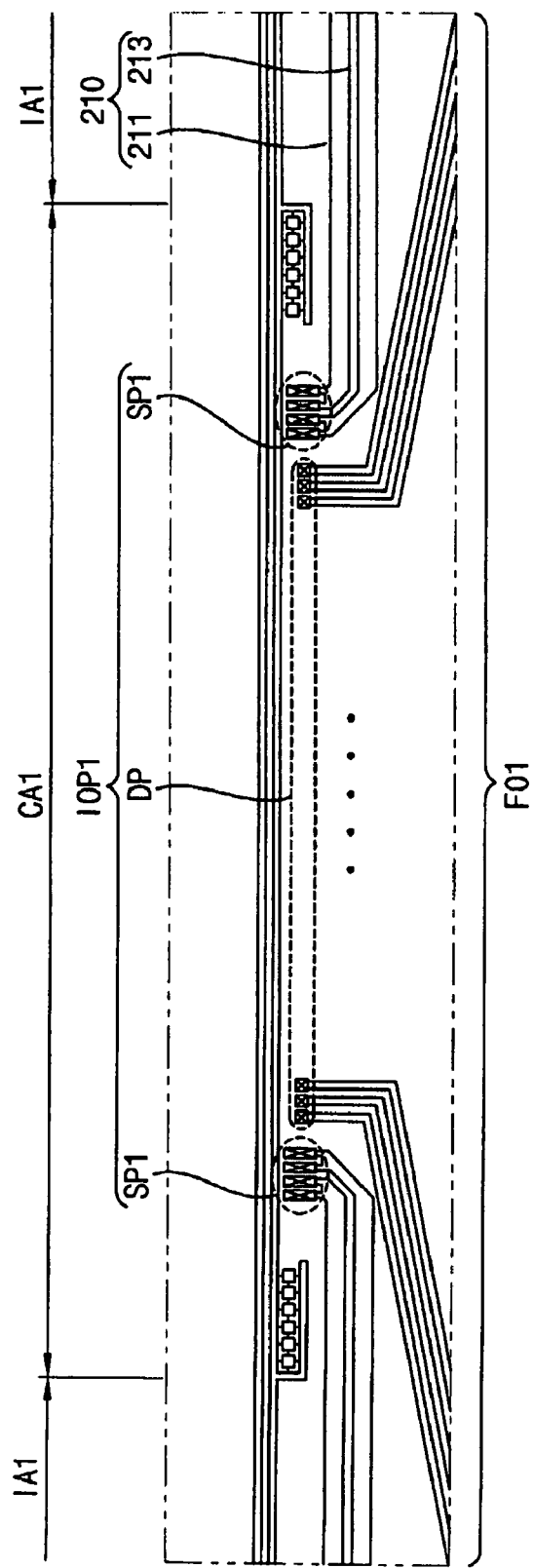
FIG. 2A is a partially enlarged plan view illustrating the first peripheral area in FIG. 1.
Figure 2B:
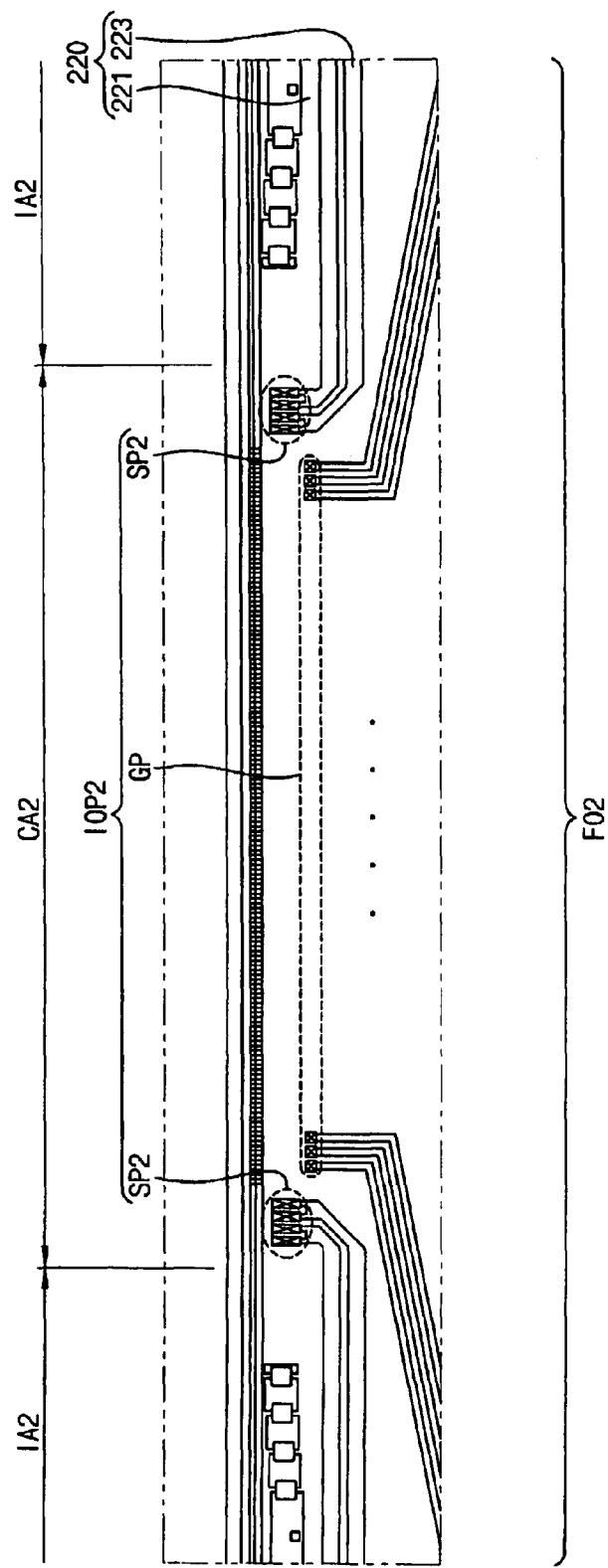
FIG. 2B is a partially enlarged plan view illustrating the second peripheral area in FIG. 1.

FIG. 2A is a partially enlarged plan view illustrating the first peripheral area in FIG. 1. FIG. 2B is a partially enlarged plan view illustrating the second peripheral area in FIG. 1. Referring to FIGS. 1 and 2A, the first peripheral area PA1 is sectioned into a first mounting area CA1 and a first separating area IA1 positioned between the neighboring first mounting areas CA1. The source TCPs are mounted on the first mounting area CA1. A first input-output pad part IOP1 electrically connected with input-output terminals of the source TCPs is formed in the first mounting area CA1. The first signal line part 210 for transmitting the source driving signal in a cascade mode is formed in the first separating area IA1.

The first input-output pad part IOP1 includes a source pad part DP and a first signal pad part SP1. The source pad part DP is electrically connected with a first fan out part FO1 and applies the data signal to the source lines DL. The first signal pad part SP1 is electrically connected with the first signal line part 210. The first signal line part 210 includes a power line 211 transmitting a power voltage VDD and a ground line 213 transmitting a ground voltage VSS. The first signal line part 210 may have a vertical multiplex or interleaved structure, for example, having a first line and a second line that are stacked such that the first and second lines are insulated from each other. The first signal pad part SP1 may have a horizontal multiplex structure that includes a first pad integrally formed with the first line and a second pad integrally formed with the second line.

Referring to FIGS. 1 and 2B, the second peripheral area PA2 is sectioned into a second mounting area CA2 and a second separating area IA2. The gate TCPs are mounted on the second mounting area CA2. A second input-output pad part IOP2 electrically connected with input-output terminals of the gate TCPs is formed in the second mounting area CA2. The second signal line part 220 for transmitting the gate driving signal in a cascade mode is formed in the second separating area IA2. The second input-output pad part IOP2 includes a gate pad part GP and a second signal pad part SP2. The gate pad part GP is electrically connected with a second fan out part FO2 and applies the gate signal to the gate lines GL. The second signal pad part SP2 is electrically connected with the second signal line part 220. The second signal line part 220 includes a power line 221 transmitting a gate on voltage VON and a ground line 223 transmitting a gate off voltage VOFF. The gate signal line part 220 may have a vertical multiplex structure, for example, having a first line and a second line that are stacked such that the first and second lines are insulated from each other. The second signal pad part SP2 may have a horizontal multiplex structure that includes a first pad integrally formed with the first line and a second pad integrally formed with the second line.

Referring to FIGS. 2A and 2B, the first and second signal line parts 210 and 220 are formed in a structure having a first line and a second line that are stacked such that the first and second lines are insulated from each other. Each of the first and second signal pad part SP1 and SP2 that are connected with the first and second signal line parts 210 and 220, respectively includes a first pad connected with the first line and a second pad connected with the second line. Hereinafter, the exemplary embodiment of the present invention will be explained in more detail with referring to the second signal line part 220 and the second signal pad part SP2.

Figure 3:
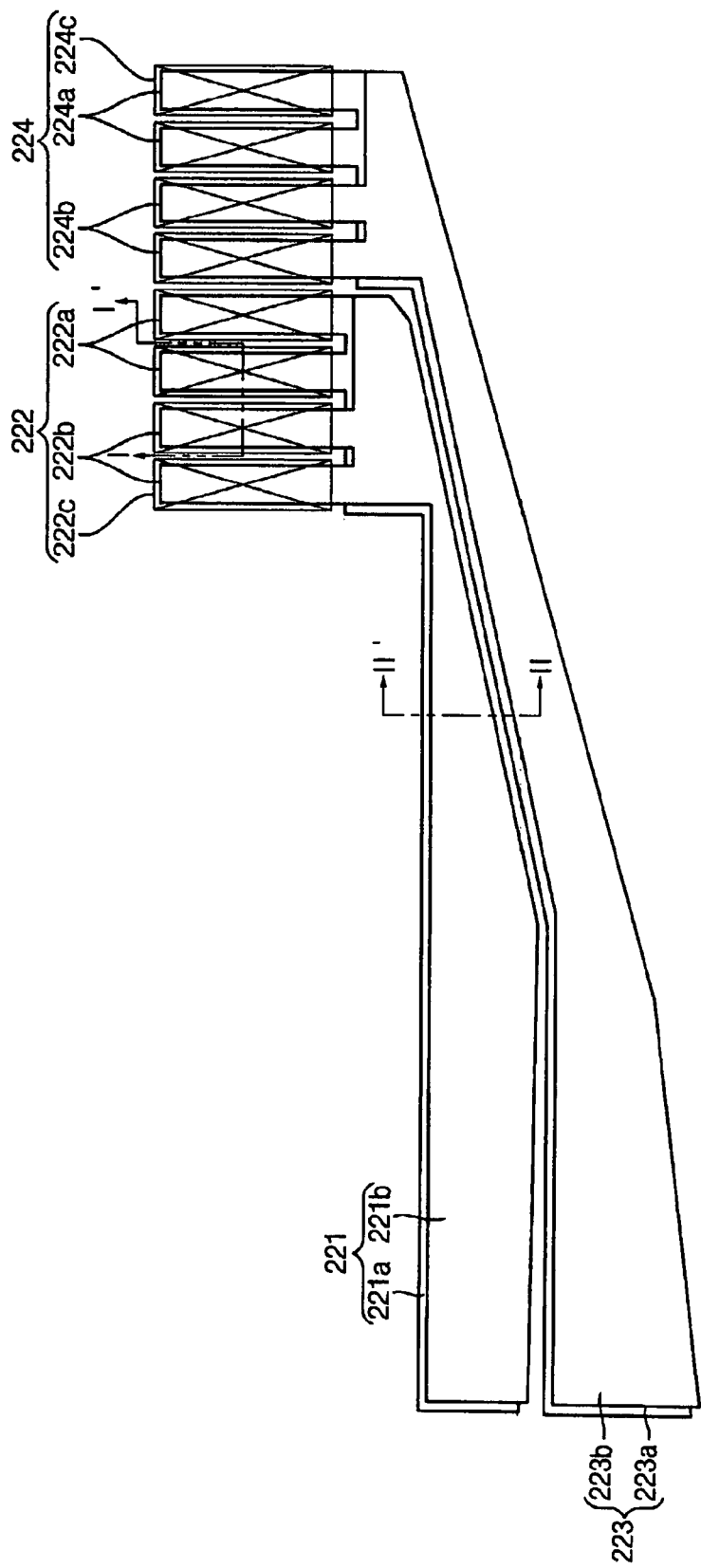
FIG. 3 is an enlarged plan view illustrating the second signal line part and the second signal pad part in FIG. 2B.
Figure 4:
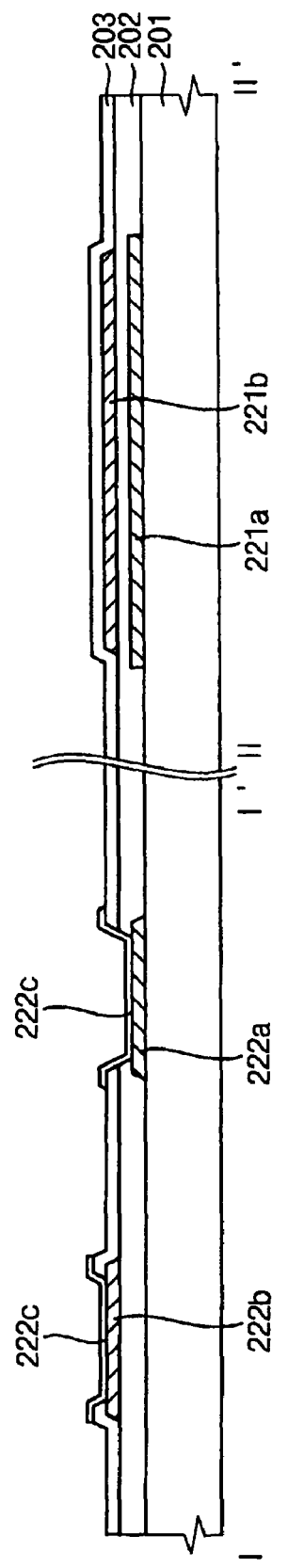
FIG. 4 is a partial cross-sectional view taken along a line I-I' and a line II-II' in FIG. 3.

FIG. 3 is an enlarged plan view illustrating the second signal line part and the second signal pad part in FIG. 2B. FIG. 4 is a partial cross-sectional view taken along a line I-I' and a line II-II' in FIG. 3. Referring to FIGS. 3 and 4, the signal line part includes the power line 221 and the ground line 223. The second signal line part includes a power pad part 222 formed at an end portion of the power line 221, and a ground pad part 224 formed at an end portion of the ground line 223. For example, a first line 221a of the power line 221 and a first pad 222a of the power pad part 222 are formed on a base substrate 201. The first pad 222a of the power pad part 222 is formed at an end portion of the first line 221a. The first line 221a and the first pad 222a are formed with a first conductive layer. The first conductive layer may be a gate metal layer forming the gate line GL and a gate electrode of the switching element TFT connected with the gate line GL.

A gate insulating layer 202 is formed over the first line 221a and the first pad 222a. A second line 221b of the power line 221 is formed over the gate insulating layer 202 so that the second line 221b overlaps with the first line 221a. A second pad 222b of the power pad part 222 is formed at an end portion of the second line 221b. The second line 221b and the second pad 222b are formed with a second conductive layer. The second conductive layer may be a source metal layer forming the source line DL, a source electrode and a drain electrode of the switching element TFT. A passivation layer 203 is formed over the second line 221b and the second pad 222b. A contact hole exposing the first and second pads 222a and 222b is formed at the passivation layer 203. A conductive pattern 222c electrically connected with the first and second pads 222a and 222b via the contact hole is formed on the passivation layer 203. The conductive pattern 222c is formed with a third conductive layer. The third conductive layer may be a transparent conductive layer forming a pixel electrode of the liquid crystal capacitor CLC electrically connected with the switching element TFT. The first line 221a receives the gate on voltage VON through the first pad 222a, and the second line 221b receives the gate on voltage VON through the second pad 222b. The power line 221 has a parallel connection resistance because the first line 221a and the second line 221b are formed in parallel with each other. Therefore, the line resistance of the power line 221 may be reduced.

Figure 5:
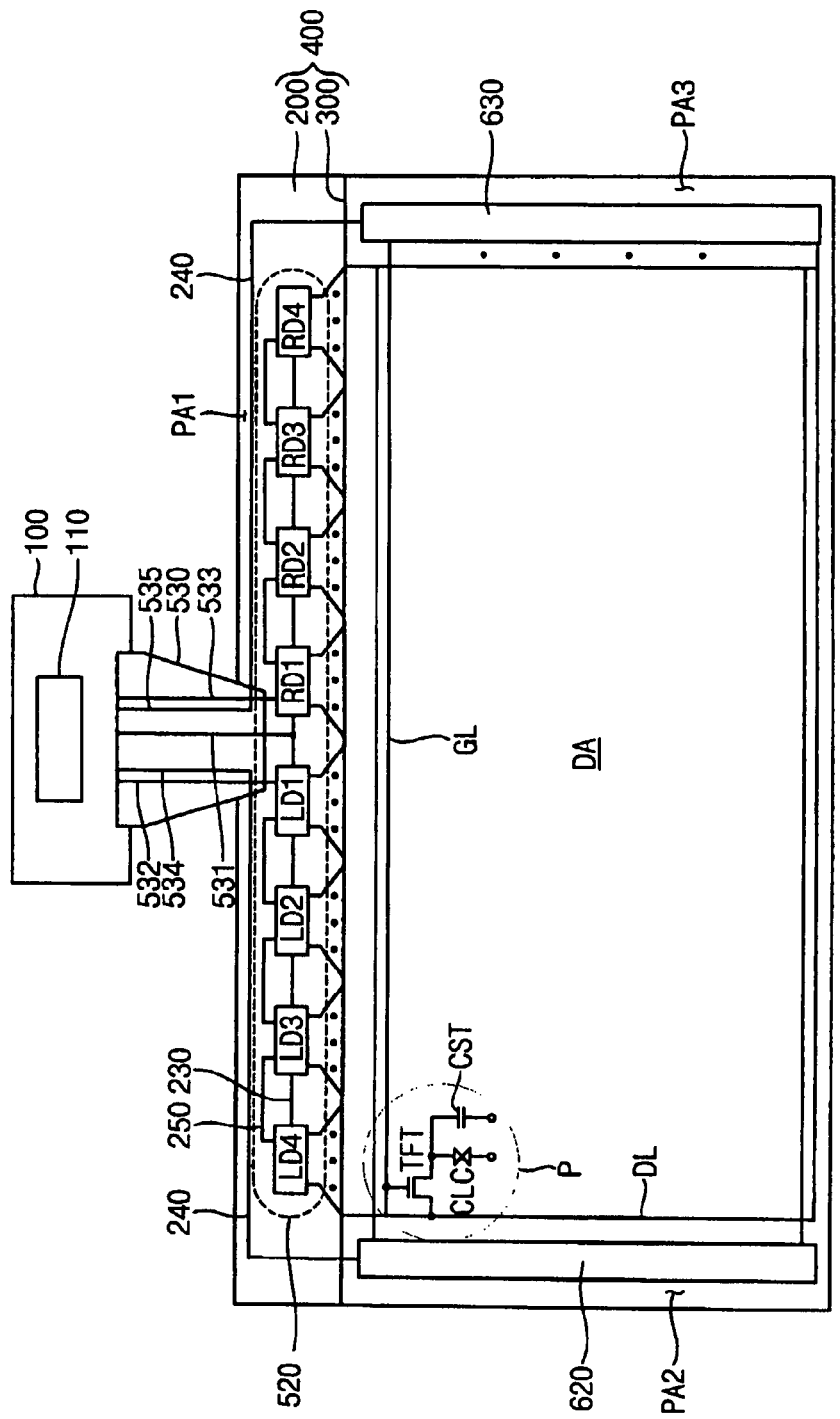
FIG. 5 is a plan view illustrating a display device according to a second exemplary embodiment of the present invention.

FIG. 5 is a plan view illustrating a display device according to a second exemplary embodiment of the present invention. Referring to FIG. 5, the display device includes a printed circuit board 100, a display panel 400, and a flexible printed circuit board 530. The display panel 400 includes a display substrate 200 and an opposite substrate 300 to be combined with the display substrate 200 to receive a liquid crystal layer (not illustrated). The display panel 400 includes a display area DA displaying an image, and first, second and third peripheral areas PA1, PA2 and PA3 surrounding the display area DA. A source driving part 520 applying a data signal to a source line DL is mounted on the first peripheral area PA1. The source driving part 520 includes first, second, third, fourth, fifth, sixth, seventh and eighth source driving chips LD1, LD2, LD3, LD4, RD1, RD2, RD3 and RD4. For example, the first, second, third and fourth source driving chips LD1, LD2, LD3 and LD4 are mounted on a left side of the first peripheral area PA1, and the fifth, sixth, seventh and eighth source driving chips RD1, RD2, RD3 and RD4 are mounted on a right side of the first peripheral area PA1.

A first signal line part 230, a second signal line part 240 and a connecting line part 250 are formed in the first peripheral area PA1. The first signal line part 230 is connected in cascade mode with the first, second, third, fourth, fifth, sixth, seventh and eighth source driving chips LD1, LD2, LD3, LD4, RD1, RD2, RD3 and RD4, to transmit a source driving signal thereto. The second signal line part 240 is electrically connected with each of a first gate driving part 620 and a second gate driving part 630, and transmits a gate driving signal thereto. The connecting line part 250 electrically connects the neighboring first and second source driving chips LD1 and LD2, and transmits a data signal thereto. The source driving signal may include a power voltage VDD and a ground voltage VSS for driving the first, second, third, fourth, fifth, sixth, seventh and eighth source driving chips LD1, LD2, LD3, LD4, RD1, RD2, RD3 and RD4. The gate driving signal may include a gate on voltage VON and a gate off voltage VOFF for driving the first and second gate driving parts 620 and 630. The first signal line part 230 may have a vertical multiplex structure, for example, having a first line and a second line that are stacked such that the first and second lines are insulated from each other. A first signal pad part (not illustrated) electrically connecting the first signal line part 230 with the first driving chip LD1 is formed in the first peripheral area PA1. The first signal pad part may have a horizontal multiplex structure that includes a first pad integrally formed with the first line of the first signal line part 230 and a second pad integrally formed with the second line of the first signal line part 230.

The second signal line part 240 may also have a vertical multiplex structure like in mentioned above. A second signal pad part (not illustrated) electrically connecting the second signal line part 240 with the flexible printed circuit board 530 (or a first and a second gate driving parts) may be formed in the horizontal multiplex structure like in mentioned above. The first and second gate driving parts 620 and 630 transmitting a gate signal to a gate line GL are formed in the second and third peripheral areas PA2 and PA3, respectively. The first and second gate driving parts 620 and 630 are electrically connected with the gate line GL, and transmit a gate signal thereto. In this exemplary embodiment, the first and second gate driving parts 620 and 630 are respectively formed in the second and third peripheral areas PA2 and PA3 that are positioned at each side of the display are DA, but may be formed only in the second peripheral area PA2 in another exemplary embodiment.

First, second, third, fourth and fifth line parts 531, 532, 533, 534 and 535 electrically connecting the printed circuit board 100 and the display panel 400 are formed at the flexible printed circuit board 530. For example, the first line part 531 transmits a source driving signal to the first signal line part 230. The source driving signal includes a power voltage and a ground voltage. The second line part 532 transmits a data signal to the first, second, third and fourth source driving chips LD1, LD2, LD3 and LD4 mounted on a left side of the first peripheral area PA1. The third line part 533 transmits the data signal to the fifth, sixth, seventh and eighth source driving chips RD1, RD2, RD3 and RD4 mounted on a right side of the first peripheral area PA1. The fourth line part 534 transmits a gate driving signal to the first gate driving part 620 formed in the second peripheral area PA2, and the fifth line part 535 transmits a gate driving signal to the second gate driving part 630 formed in the third peripheral area PA3.

Figure 6:
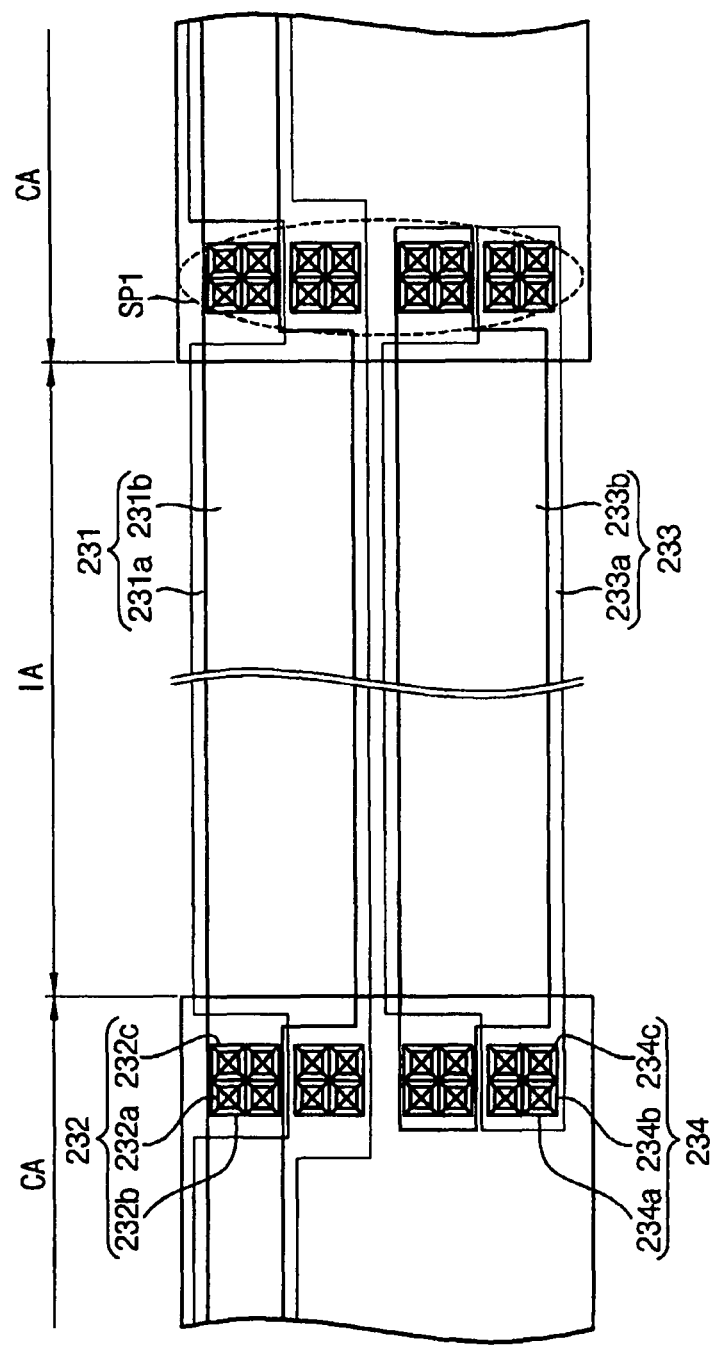
FIG. 6 is a partially enlarged plan view illustrating the first peripheral area in FIG. 5.

FIG. 6 is a partially enlarged plan view illustrating the first peripheral area in FIG. 5. Referring to FIGS. 5 and 6, the first peripheral area PA1 is sectioned into a mounting area CA and a separating area IA positioned between the neighboring mounting areas CA. The source driving chips are mounted on the mounting area CA. The first signal line part 230 is formed in the separating area IA. A first signal pad part SP1 electrically connecting the first signal line part 230 and the source driving chip is formed on the mounting area CA. The first signal line part 230 may be commonly formed in both the mounting area CA and the separating area IA.

The first signal line part 230 includes a power line 231 transmitting a power voltage VDD and a ground line 233 transmitting a ground voltage VSS. The first signal pad part SP1 includes a power pad part 232 electrically connected with the power line 231, and a ground pad part 234 electrically connected with the ground line 233. The first signal line part 230 may have a vertical multiplex structure, for example, having a first line and a second line that are stacked such that the first and second lines are insulated from each other. The first signal pad part SP1 may have a horizontal multiplex structure that includes a first pad electrically connected with the first line and a second pad electrically connected with the second line. The power line 231 includes a first line 231a formed with a first conductive layer and a second line 231b formed with a second conductive layer. The second line 231b is formed so that the second line 231b overlaps with the first line 231a. A first pad 232a of the power pad part 232 is integrally formed with the first line 231a, and a second pad 232b of the power pad part 232 is integrally formed with the second line 231b. The first and second pads 232a and 232b of the power pad part 232 are electrically connected with a conductive pattern 232c formed with a third conductive layer. The first and second lines 231a and 231b of the power line 231 form a parallelly connected line resistance, so that the line resistance of the power line 231 may be reduced.

The ground line 233 includes a first line 233a formed with the first conductive layer and a second line 233b formed with the second conductive layer. The second line 233b is formed so that the second line 233b overlaps with the first line 233a. A first pad 234a of the ground pad part 234 is integrally formed with the first line 233a, and a second pad 234b of the ground pad part 234 is integrally formed with the second line 234b. The first and second pads 234a and 234b of the ground pad part 234 are electrically connected with a conductive pattern 234c formed with the third conductive layer. The first and second lines 233a and 233b of the ground line 233 form a parallelly connected line resistance, so that the line resistance of the ground line 233 may be reduced.

Figure 7:
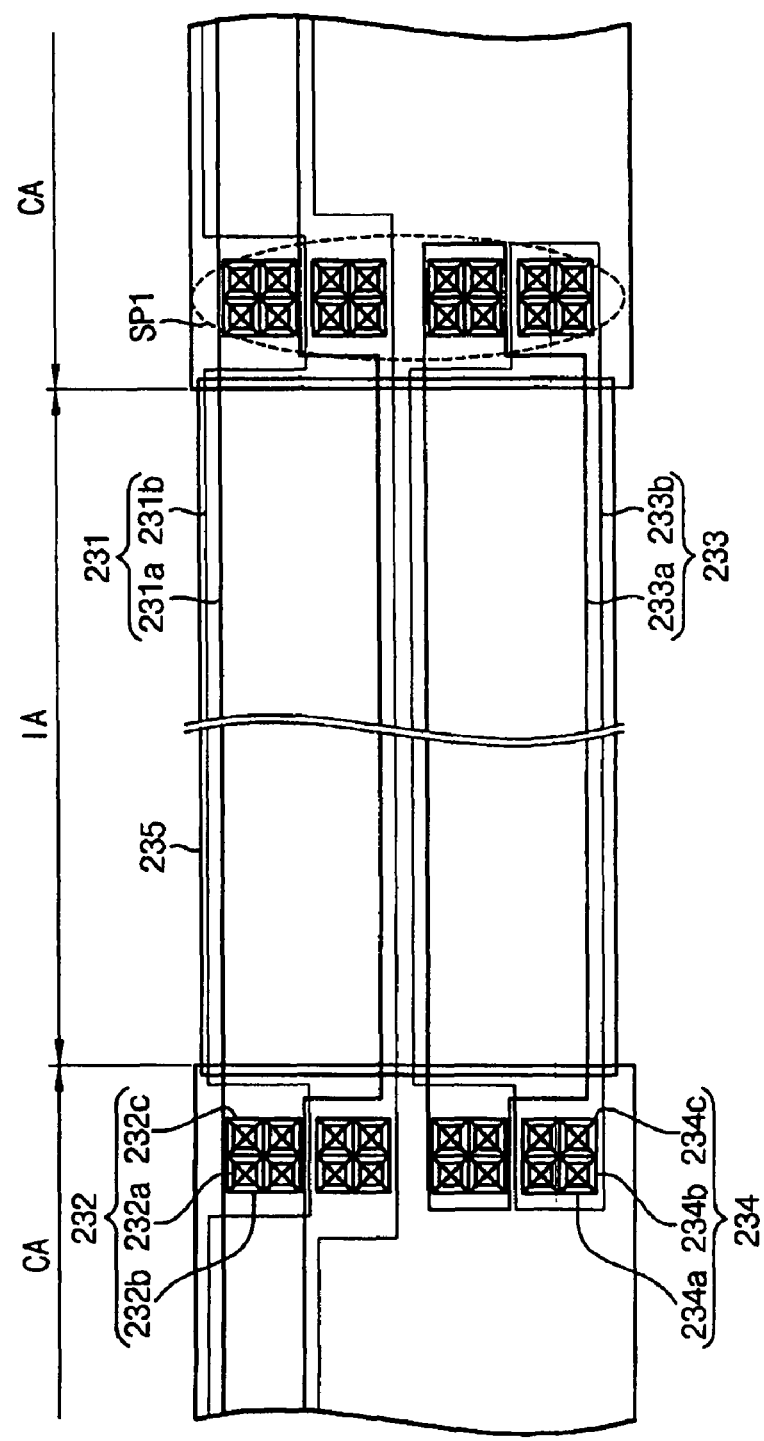
FIG. 7 is a partially enlarged plan view illustrating a first peripheral area according to a third exemplary embodiment of the present invention.

FIG. 7 is a partially enlarged plan view illustrating a first peripheral area according to a third exemplary embodiment of the present invention. The first peripheral area in FIG. 7 has a substantially same structure as the first peripheral area in FIG. 6 except for a protecting pattern. Therefore, the same reference number will be used to refer to the same parts as those described in FIG. 6, and detailed descriptions of the same elements will be omitted. Referring to FIGS. 6 and 7, a first signal line part 230 is formed in the first peripheral area PA1. The first signal line part 230 includes first lines 231a and 233a formed with a first conductive layer, second lines 231b and 233b formed with a second conductive layer, and a protecting pattern 235 formed with a third conductive layer. The protecting pattern 235 covers the second lines 231b and 233b formed with the second conductive layer, and formed to be in an electrically floating state. A thin passivation layer having a thickness of about 2000 Å (Angstrom, $10^{-10}$ meters) is formed over the second lines 231b and 233b. In this case, the thin thickness of the passivation layer causes a pinhole in the air, and the second lines 231b and 233b may be corroded because of the pinhole. Through forming the protecting pattern 235 to cover the second lines 231b and 233b, a reliability of the first signal line part 230 may be improved. In FIG. 7, the protecting pattern 235 is integrally formed over the power line 231 and the ground line 233, but the protecting pattern may be separately formed to cover the power line 231 and the ground line 233, respectively.

Figure 8:
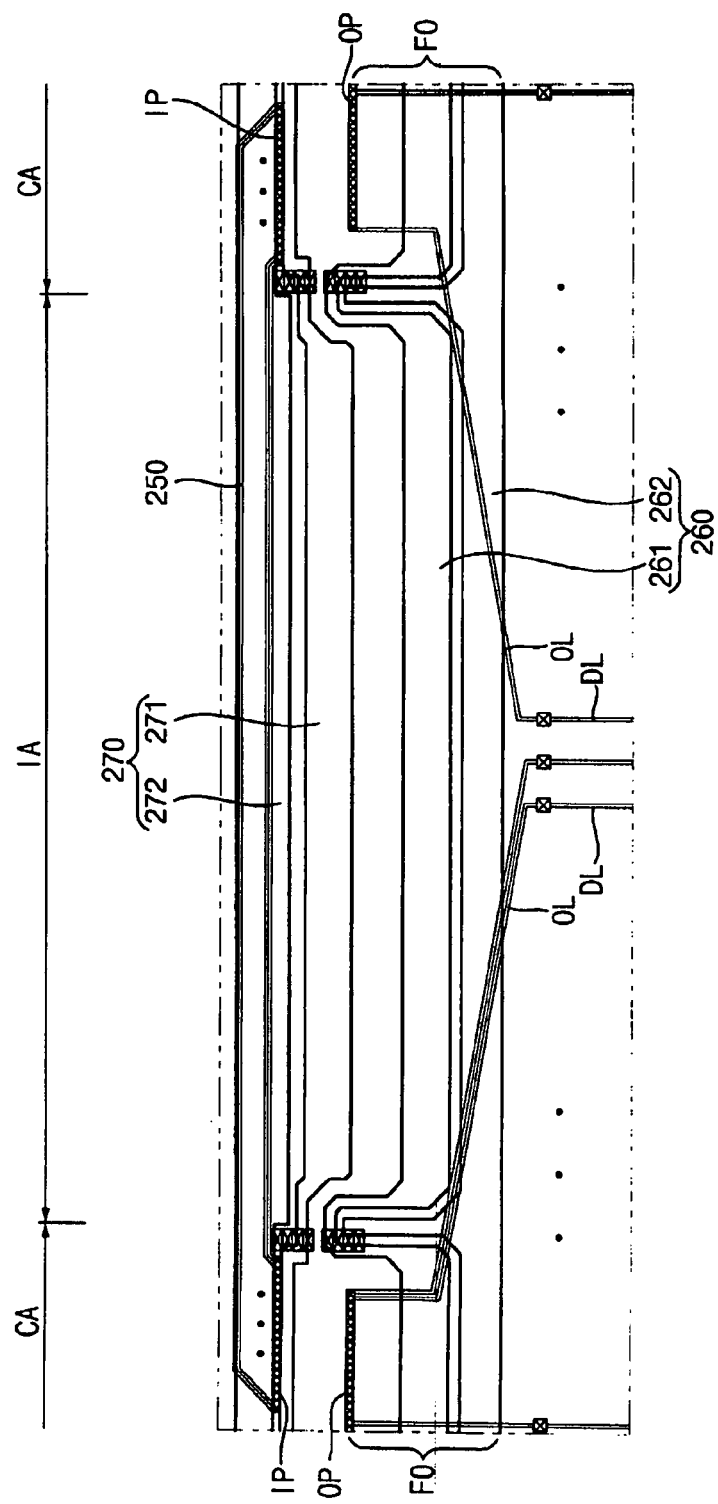
FIG. 8 is a partially enlarged plan view illustrating a display device according to a fourth exemplary embodiment of the present invention.

FIG. 8 is a partially enlarged plan view illustrating a display device according to a fourth exemplary embodiment of the present invention. Referring to FIGS. 5 and 8, a first peripheral area PA1 of a display panel is sectioned into a mounting area CA and a separating area IA positioned between the neighboring mounting areas CA. A source driving chip is mounted in the mounting area CA. A connecting line part 250 for transmitting a data signal is formed in the separating area IA. A first signal line part 260 and a second signal line part 270 are formed commonly in both the mounting area CA and the separating area IA. The first signal line part 260 includes a power line 261 and a ground line 262 that transmit first source driving signals VDD1 and VSS1, respectively. The second signal line part 270 includes a power line 271 and a ground line 272 that transmit second source driving signals VDD2 and VSS2, respectively.

An input pad part IP, an output pad part OP, a first signal pad part SP1 and a second signal pad part SP2 are formed on the mounting area CA. The input pad part IP is in contact with an input terminal of the source driving chip, and the output pad part OP is in contact with an output terminal of the source driving chip. The first signal pad part SP1 connects the first signal line part 260 with the source driving chip, and the second signal pad part SP2 connects the second signal line part 270 with the source driving chip. A fan out part FO is formed in the mounting area CA and the separating area IA. The fan out part FO electrically connects the output pad part OP with a source line DL. The first signal line part 260 is extended from a lower portion of the mounting area CA to the separating area IA to cross the fan out part FO. The first signal line part 260 and the fan out part FO are formed with conductive layers insulated from each other, and formed to partially overlap. Accordingly, a voltage drop of the driving voltage transmitted via the first signal line part 260 may be prevented. Moreover, a line resistance of the first signal line part 260 may be reduced because another line is formed at another layer over the first signal line part.

The first signal line part 260 may have a vertical multiplex structure, for example, that includes a first line formed with a first conductive layer and a second line formed with a second conductive layer, where the first line and the second line are insulated from each other and are stacked. The fan out part FO is formed with a third conductive layer insulated with the second conductive layer. The first signal pad part SP1 may have a horizontal multiplex structure that includes a first pad electrically connected with the first line and a second pad electrically connected with the second line part 260. The second signal line part 270 is extended from an upper portion of the mounting area CA to the separating area IA. The second signal line part 270 and the connecting line part 250 are formed with conductive layers insulated from each other, and formed to partially overlap. Accordingly, a voltage drop of the driving voltage transmitted via the second signal line part 270 may be prevented. Moreover, a line resistance of the second signal line part 270 may be reduced because another line is formed at another layer over the second signal line part 270. The second signal line part 270 may have a vertical multiplex structure, for example, where the first line and the second line are stacked. The first line is formed with the first conductive layer and the second line is formed with the second conductive layer. The connecting line part 250 is formed with the third conductive layer. The second signal pad part SP2 may have a horizontal multiplex structure that includes a first pad electrically connected with the first line and a second pad electrically connected with the second line.

In another exemplary embodiment, when the first signal line part 260 is sectioned into a first portion overlapped with the fan out part FO and a second portion not overlapped with the fan out part FO, the first portion may be formed in a single-layer structure, and the second portion may be formed in a multi-layer structure so that the first and second lines are stacked. Likewise, when the first signal line part 270 is sectioned into a third portion overlapped with the connecting line part 250 and a fourth portion not overlapped with the connecting line part 250, the third portion may be formed in a single-layer structure, and the fourth portion may be formed in a multi-layer structure where the first and second lines are stacked. The first and third portions are formed with the first conductive layer, and the second and the fourth portions are formed with the second conductive layer. The fan out part FO and the connecting line part 250 are formed with the second conductive layer. For example, the first conductive layer is a gate metal layer, the second conductive layer is a source metal layer, and the third conductive layer is a pixel electrode layer.

Figure 9:
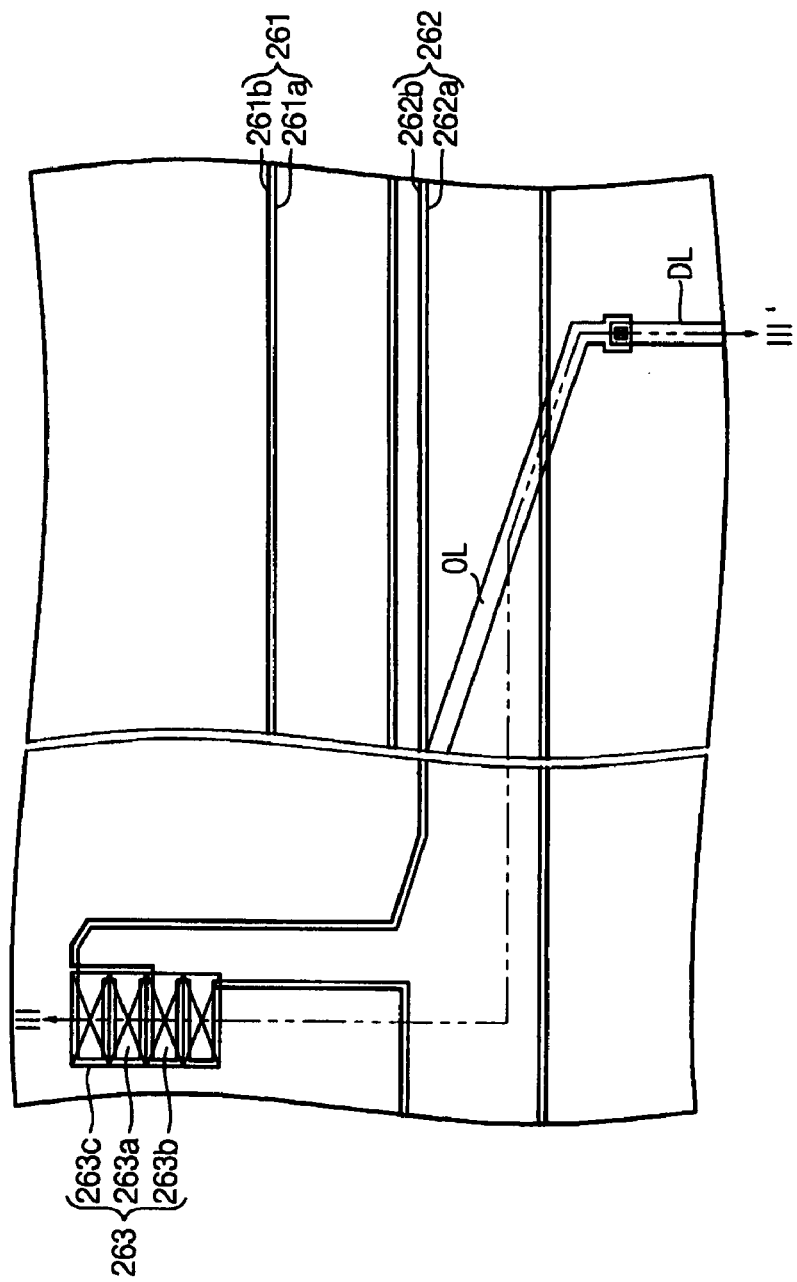
FIG. 9 is an enlarged plan view illustrating the first signal line part and the first signal pad part in FIG. 8.
Figure 10:
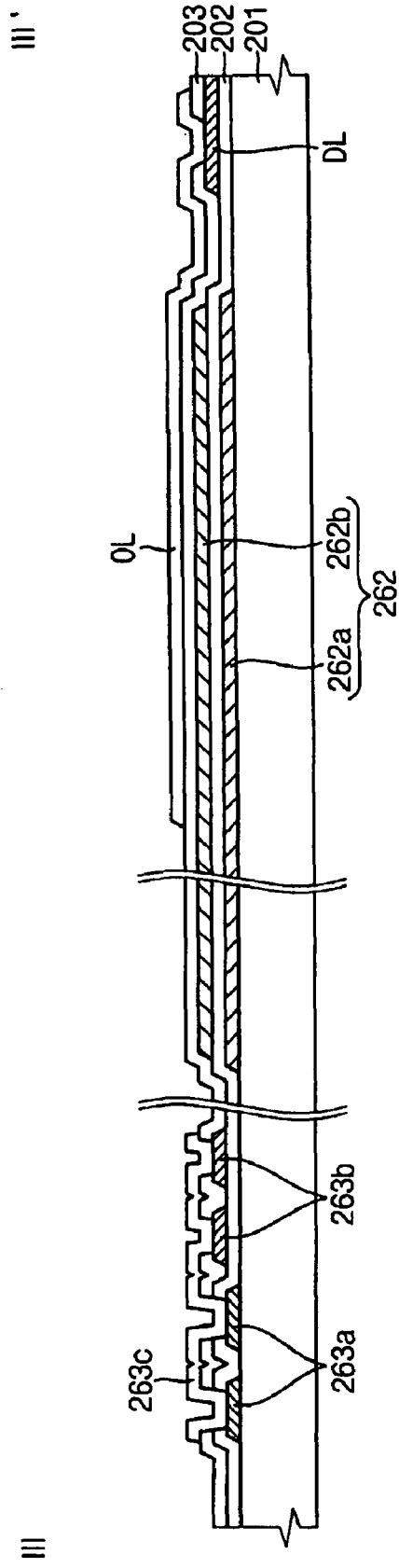
FIG. 10 is a partial cross-sectional view taken along a line III-III' in FIG. 9.

FIG. 9 is an enlarged plan view illustrating the first signal line part and the first signal pad part in FIG. 8. FIG. 10 is a partial cross-sectional view taken along a line III-III' in FIG. 9. Referring to FIGS. 8 to 10, the signal line part 260 includes the power line 261 and the ground line 262. The first signal pad part SP1 includes a power pad part (not illustrated) electrically connected with the power line 261, and a ground pad part 263 electrically connected with the ground line 262. An output line OL of the fan out part FO is formed over the ground line 262 to cross each other. The output line OL is electrically connected with the source line DL. For example, a first line 262a of the ground line 262 and a first pad 263a of the ground pad part 263 are formed on a base substrate 201. The first line 262a is formed with a first conductive layer. The first pad 263a is integrally formed with the first line 262a. The first conductive layer may be a gate metal layer forming the gate line GL and a gate electrode of a switching element TFT.

A gate insulating layer 202 is formed over the first line 262a and the first pad 263a. A second line 262b of the ground line 262 is formed over the gate insulating layer 202 with a second conductive layer so that the second line 262b overlaps with the first line 262a. A second pad 263b of the ground pad part 263 is integrally formed with the second line 262b. The second conductive layer may be a source metal layer forming the source line DL, a source electrode and a drain electrode of the switching element TFT. A passivation layer 203 is formed over the second line 262b and the second pad 263b. A contact hole exposing the first and second pads 263a and 263b is formed at the passivation layer 203. A conductive pattern 263c electrically connected with the first and second pads 263a and 263b via the contact hole is formed at the passivation layer 203. The conductive pattern 263c is formed with a third conductive layer.

The output line OL is formed with the third conductive layer over the ground line 262. An end portion of the output line OL is electrically connected with the source line DL via the contact hole. The third conductive layer may be a transparent conductive layer forming a pixel electrode of the liquid crystal capacitor CLC electrically connected with the switching element TFT. The first line 262a receives a ground voltage VSS1 through the first pad 263a, and the second line 262b receives the ground voltage VSS1 through the second pad 263b. Consequently, the ground line 262 has a parallel line resistance because the first line 262a and the second line 262b are formed in parallel with each other. Therefore, the line resistance of the ground line 262 may be reduced. Moreover, through forming the ground line 262 and the fan out part FO to overlap with each other, a surplus space of the display panel may be efficiently utilized.

According to an embodiment of the present invention as mentioned above, a signal line part directly formed on a display panel has a multiplex structure where a first line and a second line are insulated from each other and are stacked, so that a line resistance may be reduced. The signal line part is electrically connected with a signal pad part applying a driving signal thereto. The signal pad part includes a first pad applying the driving signal to the first line, and a second pad applying the driving signal to the second line. Accordingly, a first resistance caused by the first line and a second resistance caused by the second line forms a parallelly connected line resistance, so that the line resistance of the signal line part may be reduced. Moreover, another line is formed at another layer over the first signal line part to overlap with each other, so that the line resistance of the signal line part may be minimized and a space of the display panel where lines are to be formed may be more efficiently utilized.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display substrate, comprising:
a plurality of pixel parts formed in a display area;
a signal line part formed in a peripheral area surrounding the display area, the signal line part including:
a first line formed with a first conductive layer; and
a second line formed with a second conductive layer over the first line, the second line overlapping the first line;
a signal pad part including:
a first pad integrally formed with the first line; and
a second pad integrally formed with the second line; and
a driving circuit part electrically connected to the signal line part and configured to output a drive signal,
wherein the first line and the second line are configured to transmit a same drive signal.

2. The display substrate of claim 1, further comprising a protecting pattern formed with a third conductive layer to cover the second line.

3. A display device, comprising:
a plurality of pixel parts formed in a display area;
a signal line part formed in a peripheral area surrounding the display area, the signal line part including:
a first line formed with a first conductive layer; and
a second line formed with a second conductive layer over the first line, the second line overlapping the first line;
a signal pad part including:
a first pad integrally formed with the first line; and
a second pad integrally formed with the second line; and
a driving circuit part electrically connected to the signal line part and configured to output a drive signal,
wherein the first line and the second line are configured to transmit a same drive signal.

4. The display device of claim 3, wherein the signal pad part further includes a conductive pattern electrically connected with the first pad and the second pad, and the conductive pattern is formed with a third conductive layer.

5. The display device of claim 4, further comprising a protecting pattern formed with the third conductive layer to cover the second line.

6. The display device of claim 4, further comprising:
a gate line electrically connected with the pixel parts, the gate line formed with the first conductive layer in the display area; and
a gate driving part outputting a gate signal to the gate line, the gate driving part formed in the peripheral area.

7. The display device of claim 6, wherein the signal line part transmits a gate driving signal for driving the gate driving part.

8. The display device of claim 6, wherein the gate driving part is a gate tape carrier package on which a gate driving chip producing the gate signal is mounted.

9. The display device of claim 4, further comprising:
a source line electrically connected with the pixel parts, the source line formed with the second conductive layer in the display area; and
a source driving part outputting a data signal to the source line, the source driving part formed in the peripheral area.

10. The display device of claim 9, wherein the signal line part transmits a source driving signal for driving the source driving part.

11. The display device of claim 9, wherein the source driving part is a source tape carrier package on which a source driving chip producing the data signal is mounted.

12. The display device of claim 9, further comprising:
an output pad part electrically connected with an output terminal of the source driving part;
a fan out part electrically connecting the output pad part with the source line;
an input pad part electrically connected with an input terminal of the source driving part; and
a connecting line part electrically connected with the input pad part, the connecting line part formed in the peripheral area.

13. The display device of claim 12, wherein the signal line part includes a first signal line part partially overlapped with the fan out part, and a second signal line part partially overlapped with the connecting line part.

14. The display device of claim 13, wherein the fan out part and the connecting line part are formed with the third conductive layer.

15. The display device of claim 13, wherein the first signal line part is sectioned into a first portion overlapped with the fan out part and a second portion not overlapped with the fan out part,
wherein the first portion is formed with the first line, and the second portion has a multiplex structure such that the first line and second line are stacked.

16. The display device of claim 15, wherein the second signal line part is sectioned into a third portion overlapped with the connecting line part and a fourth portion not overlapped with the connecting line part,
wherein the third portion is formed with the first line, and the fourth portion has a multiplex structure such that the first line and second line are stacked.

17. The display device of claim 16, wherein the fan out part and the connecting line part are formed with the second conductive layer.

* * * * *